United States Patent [19]
Taylor

[11] 3,781,945
[45] Jan. 1, 1974

[54] POULTRY PROCESSING MACHINE AND METHOD
[75] Inventor: John Taylor, Gloucester, England
[73] Assignee: Gordon-Johnson-Stephens Limited, Gloucester, England
[22] Filed: Oct. 28, 1971
[21] Appl. No.: 193,311

[30] Foreign Application Priority Data
Nov. 9, 1970 Great Britain.................. 53,214/70

[52] U.S. Cl. ................................................. 17/11
[51] Int. Cl............................................. A22b 3/08
[58] Field of Search ...................................17/11–12

[56] References Cited
UNITED STATES PATENTS
3,159,872  12/1964  Hill....................................... 17/11

Primary Examiner—Robert Peshock
Attorney—Larson, Taylor and Hinds

[57] ABSTRACT

A machine and method for processing birds uses a screw to convey one extremity of the birds to or in work stations, the other extremity being conveyed conventionally.

To facilitate a later crop-extracting operation, the screw may be provided with a knife and receive the necks of the birds so that the knife cuts a slit in the skin of the neck. A preferred form of screw is a conical screw and means for pressing the extremity into the screw may be rotatable rods lying generally parallel to its surface.

7 Claims, 5 Drawing Figures

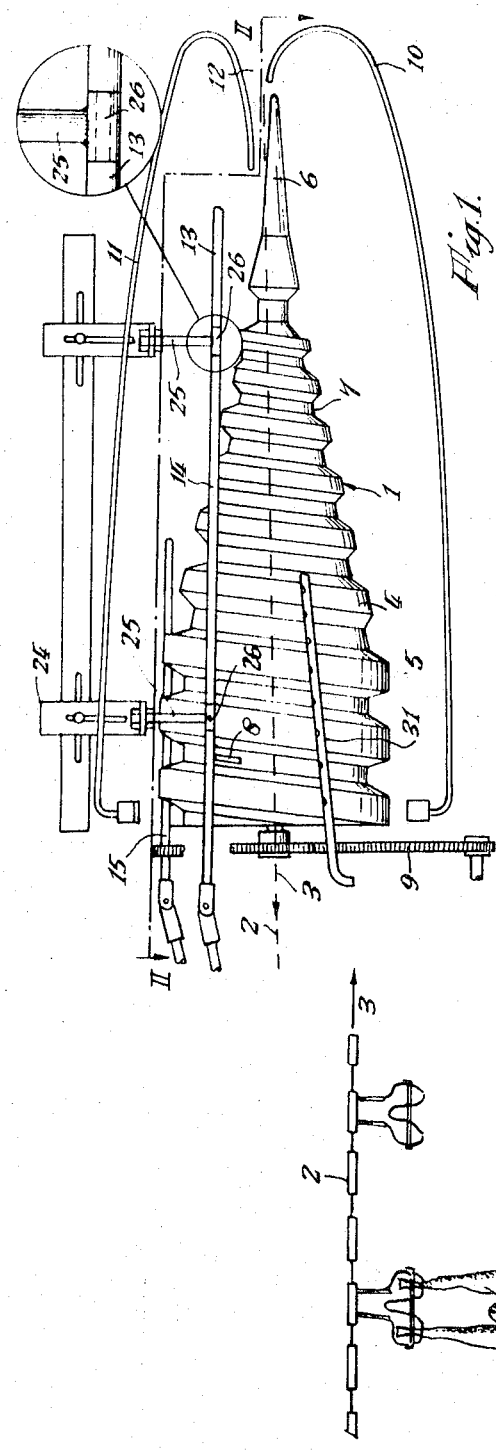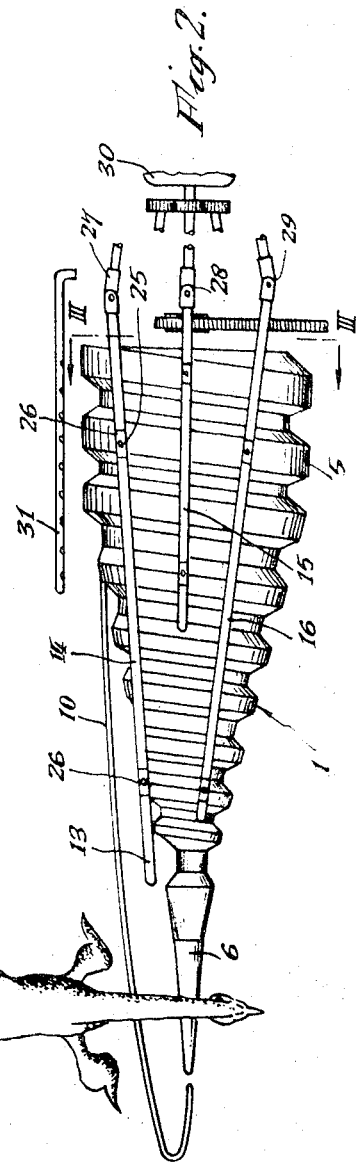

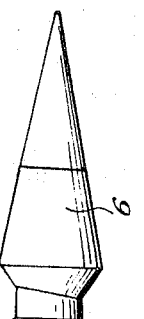
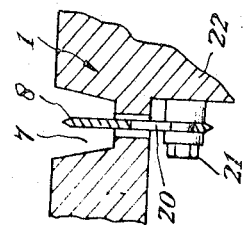
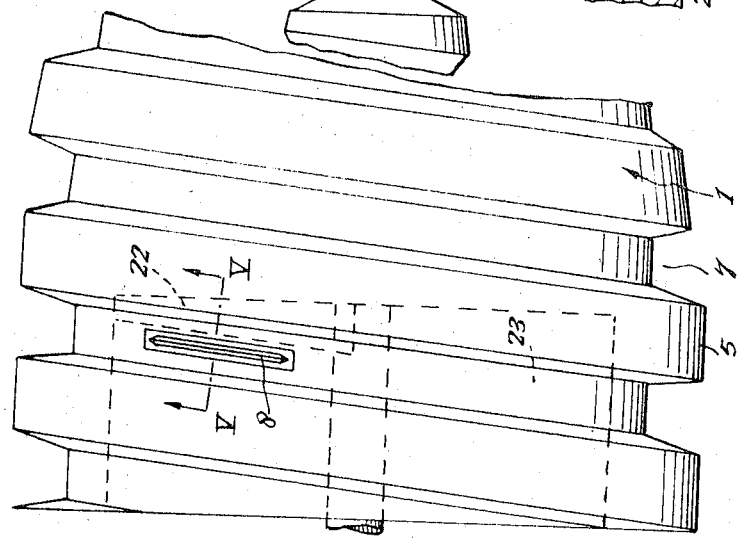
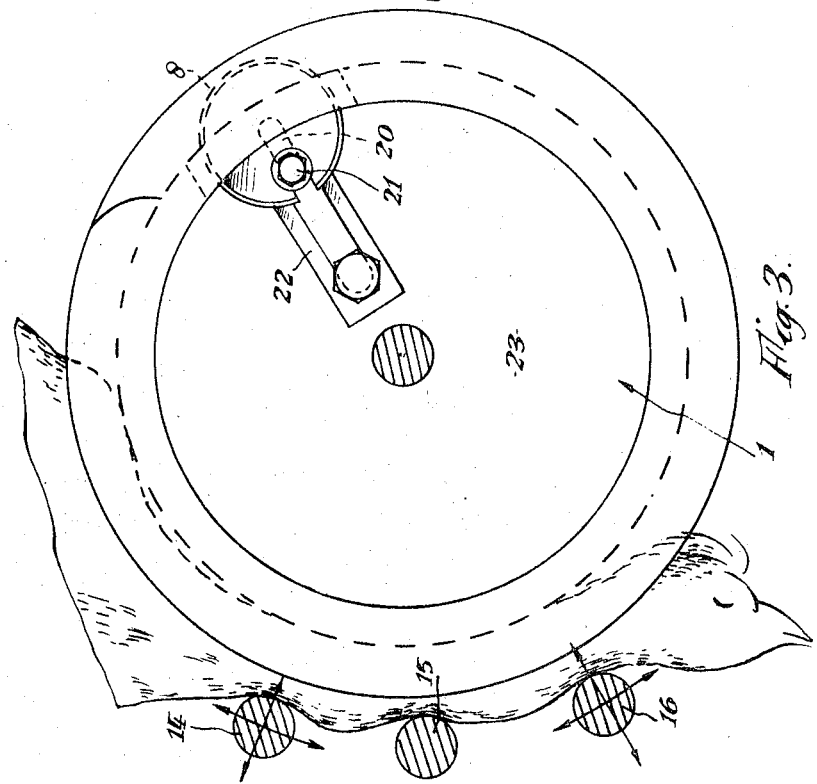

POULTRY PROCESSING MACHINE AND METHOD

This invention relates to methods and apparatus for processing slaughtered birds.

Operations on these birds during their processing, in order to prepare them for sale, are in modern plant carried out on a continuous line basis, the birds being entrained by a conveyor by one of its extremities (i.e., by the feet and legs or by the head and neck) and brought through various machine and manual work-stations. Machines such as stunners, neck cutters, bleeders, scalders, pluckers, washers, head and neck removers are used, and manual operations are such as those in which the bird is eviscerated.

It is conventional to suspend the bird from a conveyor by one of its extremities that the body of the bird hangs down to be operated on, and it is sometimes desirable to provide some accuracy of positioning or to avoid excessive drag on the extremity engaged by the moving conveyor. For that purpose it is now proposed that the other extremity should be considered also to carry out the same motion.

The invention is concerned with providing for that constraint. It has been found also that in particular embodiments an actual operation on the birds may be carried by the means providing the constraint, which then has two functions combined.

This can be illustrated with reference to one of the operations which has to be carried out on table birds ( e.g. poultry) after they have been slaughtered and defeathered, which is the extraction of the crop. Access to this organ is made possible by the making of a longitudinal slit along the back of the neck of the bird, and this slit has always previously been made manually. The work is tedious and unpleasant but has to be carried out with great exactness if there is not going to be undue damage to the skin and neck structure, and one of the embodiments of the invention provides a machine and method which carries out this operation non-manually.

The invention therefore provides a poultry processing machine and method wherein birds entrained at one extremity by a conveyor conventional for this type of use are entrained at their other extremity by a rotating screw, the said other extremity being received in and engaged by a spiral channel in the screw. It is preferred that the screw should be at least partly in the form of a spiral of constant pitch inscribed upon the surface of a cone, the apex of the cone being at the end first meeting the extremity of the bird which the screw is to engage, so that it forms an easy lead-in for that extremity.

When the invention is used to carry into effect the novel concept of automatically forming a longitudinal slit in the back of the neck of a slaughtered bird, the machine, adapted to receive a bird hung by its neck and head from a conveyor includes a screw-guide adapted to receive the necks of the birds longitudinally in the screw groove and being rotatable about an axis such that necks received in the screw groove are constrained to move along axially, a knife in the base of the groove and means for holding the neck into the groove at least at that portion of the groove where the knife is situated. An assembly for carrying out this operation on the neck of slaughtered birds may include a straight conveyor, the said screw being mounted with its axis of rotation parallel to the conveyor and the screw being spaced from the conveyor below it so as to receive the necks of birds which are held by their legs on the conveyor, with the backs of the necks in the base of the groove, and means correlating the speed of rotation of the screw and speed of motion of the conveyor so that when the necks are guided by the screw they are constrained to execute motion at the same speed as the conveyor.

In a more limited formulation of the method aspect of the invention, a method of making a longitudinal slit in the back neck skin of a slaughtered bird includes entraining the bird by its feet from a conveyor moving at constant speed, engaging the neck of the bird by means of a screw rotated with its axis parallel to the direction of movement of the conveyor and spaced from the conveyor so that the neck is guided in the screw at a speed of translation equal to that of the conveyor, pressing the neck of the bird into the screw with the back of the neck radially innermost and while pressing the neck of the bird into the screw, cutting the neck skin by means of a knife mounted in the screw.

A particular embodiment of the invention and particular method of carrying it out will now be described with reference to the accompanying drawings wherein:

FIG. 1 is a plan view of an embodiment of novel neck-slitting machine,

FIG. 2 is a side elevation of the embodiment showing also a conveyor and which for clarity is sectioned on the line II—II of FIG. 1, FIG. 3 is a sectional elevation on the line III—III of FIG. 2.

FIG. 4 is a detailed view of parts of a screw guide means in the embodiment,

FIG. 5 is a partial section on the line V—V of FIG. 4.

Firstly, it has to be made clear that in FIGS. 1 and 2 only essential parts of the embodiment are shown, all these parts being suitably supported and maintained in position by a framework which for the most part is not shown. Also, that this embodiment is one illustration only of the general inventive idea of engaging and positioning one extremity of a bird by a screw while entraining its other extremity by a known type of conveyor. It does illustrate furthermore, however, how the screw element may itself be adapted to perform a processing function, in this case the formation of a longitudinal slit in the back of the neck of the birds.

In the plan view which is FIG. 1, a screw guide 1 is to receive and transport the necks of birds suspended by their feet in known manner by shackles from a straight run of an endless chain or belt conveyor 2 not shown in this Figure but which follows a path indicated by dotted line and moves in a direction indicated by the arrow 3. The conveyor 2 is seen in FIG. 2.

A screw guide for the necks of these birds is a cone 4 with a short cylindrical portion 5 at the axial end at which it is widest, and a smooth tapering introductory nose 6 which is at the apex of the cone, the inlet end of the embodiment. A screw groove 7 is inscribed on the surface of the cone and has constant pitch, depth and axial width. The cone may be made by casting. The screw groove 7 is to receive and guide the necks of birds with the back of the neck of the bird radially inward in the groove.

In the last few revolutions of the spiral, that is to say approaching the exit end of the machine, there is a single disc-like knife 8 mounted in the base of the groove.

The knife and its mounting is best seen in FIG. 4 which will be referred to again later.

The screw-guide 1 is mounted by means of suitable bearings (not shown) so as to rotate about its central axis, and this central axis is placed parallel to and below the line of run of the conveyor. The direction of rotation, drive for which can be communicated to the guide through for example sprocket and chain link 9 from a suitable motor, is such that a neck of the bird in the spiral travels in the same direction as the conveyor, and the speed of rotation is such that the speed of the neck thus being guided and that of the conveyor are substantially equal. The necks of birds on the conveyor are guided so as to be received in the groove by guide rods 10 and 11 of the machine which are bent round at the entry end of the machine to form a converging mouth 12 which brings the necks just to one side of the cone 6 at the entry end of the machine. The guide rod 10 terminates close to and coaxially with the core 6 at the end of the screw guide 1, the guide rod 11 terminating close to the end 13 of a rotatable rod 14 which together with other rotatable rods 15 and 16 (best seen in FIG. 2) entrap the neck of the bird between themselves and the screw guide and, as the neck approaches the knife, cause it to bend to conform to the periphery of the screw guide (see FIG. 3).

As the bird's neck reaches the revolution of the screw in which the knife 8 is situated, it is being held firmly into the base of the groove with the back of the neck in the base of the groove, by the combined action of the three rods 14, 15 and 16, and as the knife 8 passes down the length of the neck in contact with the base, a longitudinal slit is made in the skin. The depth of cut is controlled by the amount of which the edge of the knife 8 projects from the base of the groove and this can be adjusted (as is best seen from FIGS. 3 and 5) because a radial slot 20 is provided in the knife 8, the knife being adjustably held by a bolt 21 working in a boss 22 inside an end recess 23 of the screw guide 1.

The length over which the cut extends can be controlled by moving rotatable rods 14, 16, as shown by the arrows in FIG. 3 that is to say either peripherally or radially of the screw guide. This movement is achieved by mounting the rotatable rod 14 on an adjustable framework indicated at 24, FIG. 1, which allows three degrees of freedom.

A similar mounting is used for rods 15, 16 but is not shown in the Figures.

The rods 14, 15, 16 are journalled for rotation by means of threaded support rods 25 which terminate in a sleeve 26 of which the outer surface is flush with the outer surface of the rods. Narrowed portions of the rods are rotatable within the sleeve. The rods 14, 15, 16 are rotated, through universal joints 27, 28, 29 from a common drive motor 30. Their rotation is to assist the easy slippage of the necks along them in their respective axial directions.

A water-spray 31 washes the area of the screw guide where the knife is operative.

In other embodiments of the invention, the screw guide may be a cylindrical worm-like screw. The means pressing the neck of the bird into the screw-guide need not be rotatable rods but could be fixed skids or could be rollers.

I claim:

1. Machine for processing slaughtered birds which is adapted to receive birds suspended by their legs from a conveyor to travel through the machine in a given direction, having a rotatable screw, the axis of rotation of the screw disposed parallel to the direction of travel of the birds through the machine, the screw having a screw-threaded channel adapted to receive the necks of the birds and having a radially innermost base, guide means guiding the necks into the channel to press the necks against the base of the channel, and a knife mounted in the base of the channel, whereby as each neck is driven in translation by the screw the knife cuts a slit longitudinally along part of the length of the neck.

2. Machine according to claim 1 wherein there is a plurality of the said guide means adjacent the plane in which the knife is borne in rotation by the screw, spaced apart around the periphery of the screw, to flex the necks of the birds to engage against the base along a substantial fraction of one turn of the periphery of the screw.

3. Machine according to claim 1 wherein the guide means is at least one cylindrical rod extending generally parallel to the screw and rotatable about its own axis.

4. Machine according to claim 2 wherein at least one of the said plurality of guide means is a cylindrical rod extending generally parallel to the screw and rotatable abouts its own axis.

5. Machine according to claim 1 in combination with an overhead shackle conveyor-line and means for correlating the speed of travel of the conveyor and of rotation of the screw to cause translation of the legs and the necks of the birds at the same speed.

6. Machine according to claim 2 wherein the screw is a conical member, diverging in the direction of travel of the birds, the said knife being in the last turn of the channel.

7. Method of automatically making a longitudinal slit in the back of the neck of a slaughtered bird including engaging the neck of the bird in the spiral channel of a rotating screw containing a knife in the radially inner base of the channel, flexing and holding the neck therein with its back along a substantial portion of the radially inner base of one turn of the channel, and cutting along the back of the neck by virtue of the rotation of the screw causing relative longitudinal motion of the knife and the neck.

\* \* \* \* \*